United States Patent [19]

Gerunda et al.

[11] 4,311,677
[45] Jan. 19, 1982

[54] PROCESS FOR PRODUCING PHOSPHORIC ACID

[75] Inventors: Arthur B. Gerunda, West Islip; Walter E. Goers, Briarcliff Manor, both of N.Y.

[73] Assignee: Swiss Aluminium Ltd., Chippis, Switzerland

[21] Appl. No.: 99,917

[22] Filed: Dec. 3, 1979

[51] Int. Cl.³ .................. C01B 25/237; C01B 25/228; C01G 43/00
[52] U.S. Cl. ....................................... 423/18; 423/11; 423/20; 423/320; 423/321 R
[58] Field of Search ................. 423/11, 18, 20, 321 R, 423/321 J, 320, 166

[56] References Cited

U.S. PATENT DOCUMENTS

3,653,826  4/1972  Ishihara et al. ..................... 423/320
4,180,545  12/1979  McCullough et al. ............... 423/11

FOREIGN PATENT DOCUMENTS

798189  7/1958  United Kingdom .................. 423/11

Primary Examiner—Deborah L. Kyle
Attorney, Agent, or Firm—Bachman and LaPointe

[57] ABSTRACT

Phosphoric acid and gypsum are produced from phosphate rock by digesting same with sulfuric acid to produce a high concentration of phosphoric acid and calcium sulfate hemihydrate. The solubilized uranium in the rock is rendered recoverable by reducing same from the +6 valence state to the +4 valence state during the digestion step followed by oxidizing back to the +6 valence state in a subsequent step.

11 Claims, No Drawings

PROCESS FOR PRODUCING PHOSPHORIC ACID

BACKGROUND OF THE INVENTION

The present invention relates to a process for producing a high concentration phosphoric acid and a gypsum by-product from phosphate rock. Uranium is normally present in the phosphate rock. The present invention resides in rendering the uranium readily recoverable in said process.

More specifically, the present process produces a high concentration phosphoric acid and a gypsum by-product by the steps of digesting phosphate rock and sulfuric acid to form a slurry containing the high concentration phosphoric acid and calcium sulfate hemihydrate crystals, filtering to separate the phosphoric acid, reslurrying the hemihydrate to produce calcium sulfate dihydrate and a low concentration phosphoric acid, and separating the dihydrate as a by-product and recycling the low concentration phosphoric acid, all as described in U.S. Pat. No. 3,653,826.

More commercial facilities use a wet process for producing phosphoric acid at a low concentration of about 30% $P_2O_5$. This acid is normally evaporated to higher concentrations for practical applications, which naturally involves additional expense and process steps using large quantities of steam.

Phosphate rock normally contains small amounts of uranium and it is highly desirable to be able to recover the uranium. The foregoing process which obtains phosphoric acid at a low concentration of about 30% $P_2O_5$ is attractive despite the added evaporation cost since uranium extraction methods currently practiced are technically and economically feasible, only when phosphoric acid concentrations are about 30% or less $P_2O_5$.

The hemihydrate process on the other hand is desirable in that it produces phosphoric acid with a $P_2O_5$ concentration of about 45–50% and thereby avoids the expensive evaporation step. However, disadvantageously, the hemihydrate process practiced heretofore is not suitable for uranium recovery.

It is therefore an object of the present invention to prepare high concentration phosphoric acid from phosphate rock while rendering the uranium recoverable therefrom.

It is a further object of the present invention to achieve the foregoing in an economical and commercially feasible process cycle.

Further objects and advantages of the present invention will appear hereinbelow.

SUMMARY OF THE INVENTION

In accordance with the process of the present invention it has been found that the foregoing objects and advantages may be readily achieved.

The process of the present invention produces phosphoric acid and gypsum by the steps of (1) digesting phosphate rock containing small amounts of uranium with sulfuric acid and phosphoric acid to produce a high concentration of phosphoric acid and calcium sulfate hemihydrate, (2) filtering the resulting mixture to separate the concentrated phosphoric acid, (3) reslurrying the calcium sulfate hemihydrate and hydrating to produce calcium sulfate dihydrate in a low concentration phosphoric acid, (4) filtering the resulting mixture to obtain the calcium sulfate dihydrate as a by-product and the low concentration phosphoric acid as effluent, and (5) recycling the low concentration phosphoric acid effluent.

In accordance with the improvement of the present invention the uranium in the digesting step (1) is reduced from the +6 valence state to the +4 valence state and thereby rendered insoluble in the wet process acid solution and caused to precipitate with the calcium sulfate hemihydrate. The uranium is then oxidized during the reslurrying step (3) from the +4 valence state to the +6 valence state and thereby rendered soluble in the low concentration phosphoric acid and recoverable therefrom.

Thus, in accordance with the process of the present invention the uranium is induced to precipitate and follow the hemihydrate which is subsequently converted to dihydrate (gypsum) in a low concentration phosphoric acid. Uranium may then be extracted from the low concentration phosphoric acid as by ion exchange methods, solvent extraction, or any conventional commerical means.

DETAILED DESCRIPTION

In the first step of the process of the present invention phosphate rock containing small amounts of uranium is digested with sulfuric acid and phosphoric acid to produce a high concentration of phosphoric acid and calcium sulfate hemihydrate. Preferably the phosphate rock is ground in order to provide added surface area and faster reaction time. The phosphoric acid component is preferably added at least in part by recycling from a subsequent process step and may contain either a high or low concentration phosphoric acid, e.g., acid containing from 10–50% $P_2O_5$ may be employed. Desirably, sulfuric acid of greater than 90% concentration is employed, as 90–99% concentration. The digestion mixture is preferably agitated for from 2 to 8 hours at a reaction temperature of from 60°–100° C., preferably 4 to 6 hours at 70°–95° C. In order to insure high yields it is preferred to maintain a free sulfuric acid concentration in the digestion of from about 2–3%.

In this first stage of the reaction the calcium in the rock forms an agglomerate of stable calcium sulfate hemihydrate and a high concentration phosphoric acid is produced, i.e., from 44 to 55% $P_2O_5$. This is a particular advantage of the process of the present invention as it precludes the necessity for expensive evaporation procedures to increase the concentration of the phosphoric acid.

However, present uranium extraction techniques cannot economically recover uranium from a solution that has a $P_2O_5$ concentration greater than about 30%. In accordance with the second step of the present process the slurry is filtered to separate the phosphoric acid product from the hemihydrate and the uranium would be removed from the slurry with the acid product by virtue of its solubility. The improvement of the present invention involves reducing the uranium in the digestion step from its soluble +6 valence state to the insoluble +4 valence state. This procedure causes the uranium to precipitate with the calcium sulfate hemihydrate. As will be discussed hereinbelow, the uranium is subsequently oxidized in a later step from the +4 valence state to the +6 valence state in a low concentration phosphoric acid and is thereby rendered recoverable therefrom.

Any desirable reducing agent may be employed in the digestion step. The reducing agent may be gaseous, such as $SO_2$, which can be introduced to the reactor via sparging or any other suitable means commonly practiced, solid or liquid. Additional chemicals can be added that may catalytically or in any other way, induce the rapid reduction of uranium to the insoluble state. Reducing agents and chemicals are desirable if they do not interfere with the chemical digesting of the rock, leaching of the phosphorous, chemical balance of the digestion system or cause significant changes in the physical properties of the constituents of the slurry that would give problems with subsequent unit processes or unit operations.

The reducing agents should be added in quantities that satisfy the following criteria:
  (a) At least the stoichiometric quantities needed based on the content of uranium and other components affecting the reducing process; these quantities being a function of the rock analysis.
  (b) Compatibility with the physical nature of the reaction vessels, agitators and downstream equipment with respect to the materials of construction, methods of fabrication, and etc.
  (c) There should be no serious alteration of crystal agglomeration, liquid viscosity or other properties that affect filterability, foaming or other factors of operation, or marketable characteristics of the product acid.

Selection of reducing agents are preferably those that meet the criteria above and also do not add significantly to the cost of operation. Iron as an example of solid additive and $SO_2$ as an example of gaseous additive are typical low cost reducing agents. Solutions of various sulfites and others are liquids that can be added. In general, solutions are not preferred since additional water or liquid can affect $P_2O_5$ concentration in the reaction.

The second step in the process of the present invention is to filter the resulting mixture to separate the high concentration phosphoric acid product and leave the hemihydrate filter cake containing the reduced uranium. The cake of calcium sulfate hemihydrate from which the phosphoric acid has been separated is preferably washed with recycled low concentration phosphoric acid from a subsequent process step.

The filter cake is then reslurried and hydrated to produce calcium sulfate dihydrate (gypsum) by-product and a low concentration phosphoric acid (about 10–20% $P_2O_5$). The liquid for hydrating the calcium sulfate hemihydrate should contain a low concentration phosphoric acid and a low concentration sulfuric acid. Low concentration phosphoric acid may be recycled from a subsequent processing step and sulfuric acid makeup is added as necessary. The mixture is maintained at a temperature of about 50°–80° C. and from 1 to 3 hours are normally required to convert substantially all hemihydrate to dihydrate.

Naturally the uranium is introduced to the reslurrying step in the +4 valence state. In accordance with the process of the present invention the reslurrying step is carried out in an environment that favors and promotes the oxidation of uranium from the +4 valence state to the +6 valence state and thereby rendered soluble in the low concentration phosphoric acid and recoverable therefrom. With present technology uranium may be recovered from low concentration phosphoric acid containing less than about 30% $P_2O_5$, as by ion exchange or solvent extraction.

Any desired oxidizing agent may be employed in the reslurrying step. Requirements of oxidizing agents are similar to those of reducing agents. Low cost agents are preferable. Sparging with air could well prove the easiest and cheapest. However, other conventional oxidizing agents may be readily employed, such as peroxides, chlorates, perchlorate, nitrates and permanganates.

The mixture is then filtered to obtain the calcium sulfate dihydrate as a by-product and the low concentration of phosphoric acid as effluent. The effluent contains the oxidized uranium from the reslurrying step which may be recovered therefrom as indicated hereinabove. Also as indicated hereinabove, the remaining low concentration phosphoric acid, preferably after removal of uranium therefrom, is recycled as to the digestion step, to the hemihydrate filter, or to the dihydrate filtration step, or a combination of these.

In a preferred commercial process one may utilize the detailed procedure in the aforesaid U.S. Pat. No. 3,653,826, the disclosure of which is incorporated herein by reference.

The process of the present invention and improvements resulting therefrom will be more readily apparent from a consideration of the following illustrative examples.

EXAMPLE I 300 grams of ground phosphate rock having a particle size of less than 30 mesh were added to a digester to which was added 830 grams of phosphoric acid of 37% $P_2O_5$. Uranium-free phosphoric acid was used so that all the uranium would be derived from the rock. 243 grams of concentrated $H_2SO_4$ was added and the following added as a reducing agent for the uranium: 5 grams powdered iron; 5 ml. 70% HF; and 5 grams lanthanum nitrate. The mixture was stirred together at about 90° C. for about 4 hours followed by filtering through polypropylene cloth to separate the resultant high concentration phosphoric acid (about 45% $P_2O_5$) and leave the calcium sulfate hemihydrate filter cake containing the reduced uranium. The filter cake was washed with 360 grams of uranium-free phosphoric acid (15% $P_2O_5$) and the resultant cake reslurried in 709 grams of uranium-free phosphoric acid (10% $P_2O_5$) to which 25 grams of dilute $H_2SO_4$ was added. 10 ml. of 8 m. sodium chlorate was added as oxidizing agent to oxidize the uranium and the mixture was agitated for about 1½ hours at 60° C. The mixture was filtered leaving the dihydrate cake and low concentration (10–15% $P_2O_5$) phosphoric acid as effluent containing the oxidized uranium.

The results are shown in the following data which represents starting phosphate rock analysis, phosphoric acid analysis after filtration through polypropylene cloth, and hemihydrate cake analysis.

TABLE I

| Material | Amount grams | Uranium Analysis Parts per Million | Uranium Content Milligrams |
| --- | --- | --- | --- |
| Phosphate rock | 300 | 149.5 | 44.9 |
| Phosphoric acid | 586 | 12.3 | 7.2 |
| Hemihydrate cake | 693 | 65.8 (dry) | 40.2 |

The foregoing clearly shows that substantially all of the uranium stays with the calcium sulfate hemihydrate filter cake. It is noted that the sample error is about 5% which is considered satisfactory for this difficult analytical procedure, i.e., uranium content in phosphate rock should equal uranium content in acid plus uranium content in cake or 44.9=7.2+40.2=47.4.

Additional runs were made with comparable results using the following reducing agents:

RUN 2—Reducing agent of 50 grams sodium sulfite, 10 ml. 70% HF, and 10 grams lanthanum nitrate.

RUN 3—Reducing agent of 20 grams sodium sulfite.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A process for rendering uranium readily recoverable in a process for producing phosphoric acid and gypsum by (1) digesting phosphate rock containing small amounts of uranium with sulfuric acid and phosphoric acid to produce a high concentration of phosphoric acid and calcium sulfate hemihydrate, (2) filtering the resulting mixture to separate the concentrated phosphoric acid, (3) reslurrying the calcium sulfate hemihydrate and hydrating to produce calcium sulfate dihydrate in a low concentration phosphoric acid, (4) filtering the resulting mixture to obtain the calcium sulfate dihydrate as a by-product and the low concentration phosphoric acid as effluent, and (5) recycling the low concentration phosphoric acid effluent to an earlier process step, the improvement which comprises reducing the uranium in the digestion step (1) from the +6 valence state to the +4 valence state and thereby rendering said uranium insoluble in the wet process acid solution and causing same to precipitate with the calcium sulfate hemihydrate, and oxidizing said uranium during the reslurrying step (3) from the +4 valence state to the +6 valence state and thereby rendering said uranium soluble in the low concentration phosphoric acid and recoverable therefrom.

2. A process according to claim 1 wherein the phosphoric acid in step (1) is added at least in part by recycling from a subsequent process step.

3. A process according to claim 2 wherein the recycled phosphoric acid contains from 10-50% $P_2O_5$.

4. A process according to claim 3 wherein the sulfuric acid in step (1) is of greater than 90% concentration.

5. A process according to claim 3 wherein the step (1) digestion is for 2 to 8 hours at a reaction temperature of from 60° to 100° C., wherein a free sulfuric acid concentration of 2 to 3% in the digestion is maintained.

6. A process according to claim 5 wherein the phosphoric acid produced in the step (1) digestion has a concentration of 44 to 55% $P_2O_5$.

7. A process according to claim 5 wherein the cake of calcium sulfate hemihydrate from step (2) is washed with recycled low concentration phosphoric acid.

8. A process according to claim 5 wherein the calcium sulfate hemihydrate from step (2) is reslurried and hydrated with a liquid containing a low concentration phosphoric acid and a low concentration sulfuric acid.

9. A process according to claim 8 wherein the reslurrying and hydrating mixture is maintained at from 50°-80° C. for 1 to 3 hours whereby substantially all hemihydrate is converted to dihydrate.

10. A process according to claim 1 wherein the effluent from step (4) contains oxidized uranium from the reslurrying step.

11. A process according to claim 1 including the step of recovering said uranium from said low concentration phosphoric acid.

* * * * *